United States Patent
Eyole et al.

(10) Patent No.: US 10,445,093 B2
(45) Date of Patent: Oct. 15, 2019

(54) DATA PROCESSING

(71) Applicant: ARM Limited, Cambridge (GB)

(72) Inventors: Mbou Eyole, Soham (GB); Matthias Lothar Boettcher, Cambridge (GB)

(73) Assignee: ARM Limited, Cambridge (GB)

( * ) Notice: Subject to any disclaimer, the term of this patent is extended or adjusted under 35 U.S.C. 154(b) by 383 days.

(21) Appl. No.: 15/371,670

(22) Filed: Dec. 7, 2016

(65) Prior Publication Data

US 2017/0168820 A1 Jun. 15, 2017

(30) Foreign Application Priority Data

Dec. 10, 2015 (GB) .................................. 1521796.1

(51) Int. Cl.
*G06F 9/30* (2018.01)
*G06F 9/38* (2018.01)

(52) U.S. Cl.
CPC ........ *G06F 9/30036* (2013.01); *G06F 9/3016* (2013.01); *G06F 9/30076* (2013.01); *G06F 9/30189* (2013.01); *G06F 9/3814* (2013.01); *G06F 9/3887* (2013.01)

(58) Field of Classification Search
CPC ............................ G06F 9/30036; G06F 9/3887
See application file for complete search history.

(56) References Cited

U.S. PATENT DOCUMENTS

| 2013/0159665 A1 | 6/2013 | Kashyap |
| 2013/0262833 A1 | 10/2013 | Gonion |
| 2014/0115301 A1* | 4/2014 | Sanghai .............. G06F 9/30072 712/220 |
| 2015/0019896 A1 | 1/2015 | Anderson et al. |
| 2015/0227367 A1 | 8/2015 | Eyole-Monono et al. |
| 2015/0242210 A1* | 8/2015 | Kim ..................... G06F 9/30036 712/7 |

OTHER PUBLICATIONS

Search and Exam Report for GB 1521796.1, dated Jun. 6, 2016, 7 pages.

* cited by examiner

*Primary Examiner* — Zachary K Huson
(74) *Attorney, Agent, or Firm* — NIxon & Vanderhye P.C.

(57) ABSTRACT

Data processing apparatus comprises vector processing circuitry to apply a vector processing instruction to data vectors having a data vector length, each data vector comprising a plurality of data items equal in number to the data vector length, the vector processing circuitry having circuitry defining a plurality of processing lanes, there being at least as many processing lanes as a maximum data vector length; and control circuitry to selectively vary the data vector length used by the vector processing circuitry amongst a plurality of possible data vector length values up to the maximum data vector length and to disable operation of a subset of the processing lanes so that the disabled subset of processing lanes are unavailable for use by the vector processing circuitry and there remain at least as many enabled processing lanes as the data vector length set by the control circuitry.

14 Claims, 6 Drawing Sheets

DATA PROCESSING

This application priority to GB Patent Application No. 1521796.1 filed 10 Dec. 2015, the entire contents of which is hereby incorporated by reference.

FIELD

This disclosure relates to data processing.

DESCRIPTION

Some data processing arrangements allow for vector processing operations, involving applying a single vector processing instruction to data items of a data vector having a plurality of data items at respective positions in the data vector. By contrast, scalar processing operates on, effectively, single data items rather than on data vectors.

The vector processor operates according to a data vector length, each data vector containing a plurality of data items equal in number to the data vector length.

Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

SUMMARY

In an example arrangement there is provided data processing apparatus comprising:

vector processing circuitry to apply a vector processing instruction to data vectors having a data vector length, each data vector comprising a plurality of data items equal in number to the data vector length, the vector processing circuitry having circuitry defining a plurality of processing lanes, there being at least as many processing lanes as a maximum data vector length; and control circuitry to selectively vary the data vector length used by the vector processing circuitry amongst a plurality of possible data vector length values up to the maximum data vector length and to disable operation of a subset of the processing lanes so that the disabled subset of processing lanes are unavailable for use by the vector processing circuitry and there remain at least as many enabled processing lanes as the data vector length set by the control circuitry.

In another example arrangement there is provided data processing apparatus comprising:

vector processing means for applying a vector processing instruction to data vectors having a data vector length, each data vector comprising a plurality of data items equal in number to the data vector length, the vector processing means having means defining a plurality of processing lanes, there being at least as many processing lanes as a maximum data vector length; and control means for selectively varying the data vector length used by the vector processing circuitry amongst a plurality of possible data vector length values up to the maximum data vector length;

the control means being operable to disable operation of a subset of the processing lanes so that the disabled subset of processing lanes are unavailable for use by the vector processing means and there remain at least as many enabled processing lanes as the data vector length set by the control means.

In another example arrangement there is provided a data processing method comprising:

applying a vector processing instruction to data vectors having a data vector length, each data vector comprising a plurality of data items equal in number to the data vector length, using circuitry defining a plurality of processing lanes, there being at least as many processing lanes as a maximum data vector length; and selectively varying the data vector length used by the vector processing circuitry amongst a plurality of possible data vector length values up to the maximum data vector length, by disabling operation of a subset of the processing lanes so that the disabled subset of processing lanes are unavailable for use by the vector processing circuitry and there remain at least as many enabled processing lanes as the data vector length set by the control circuitry.

The above, and other objects, features and advantages of this disclosure will be apparent from the following detailed description of illustrative embodiments which is to be read in connection with the accompanying drawings.

DRAWINGS

The present technique will be described further, by way of example only, with reference to embodiments thereof as illustrated in the accompanying drawings, in which:

FIG. 1 schematically illustrates a data processing apparatus;

FIG. 2 schematically illustrates the handling of data as multiple data vectors;

FIG. 3 schematically illustrates the operation of decoder circuitry;

FIG. 4 schematically illustrates control circuitry and part of a vector processor;

EMBODIMENTS

Figure 1:
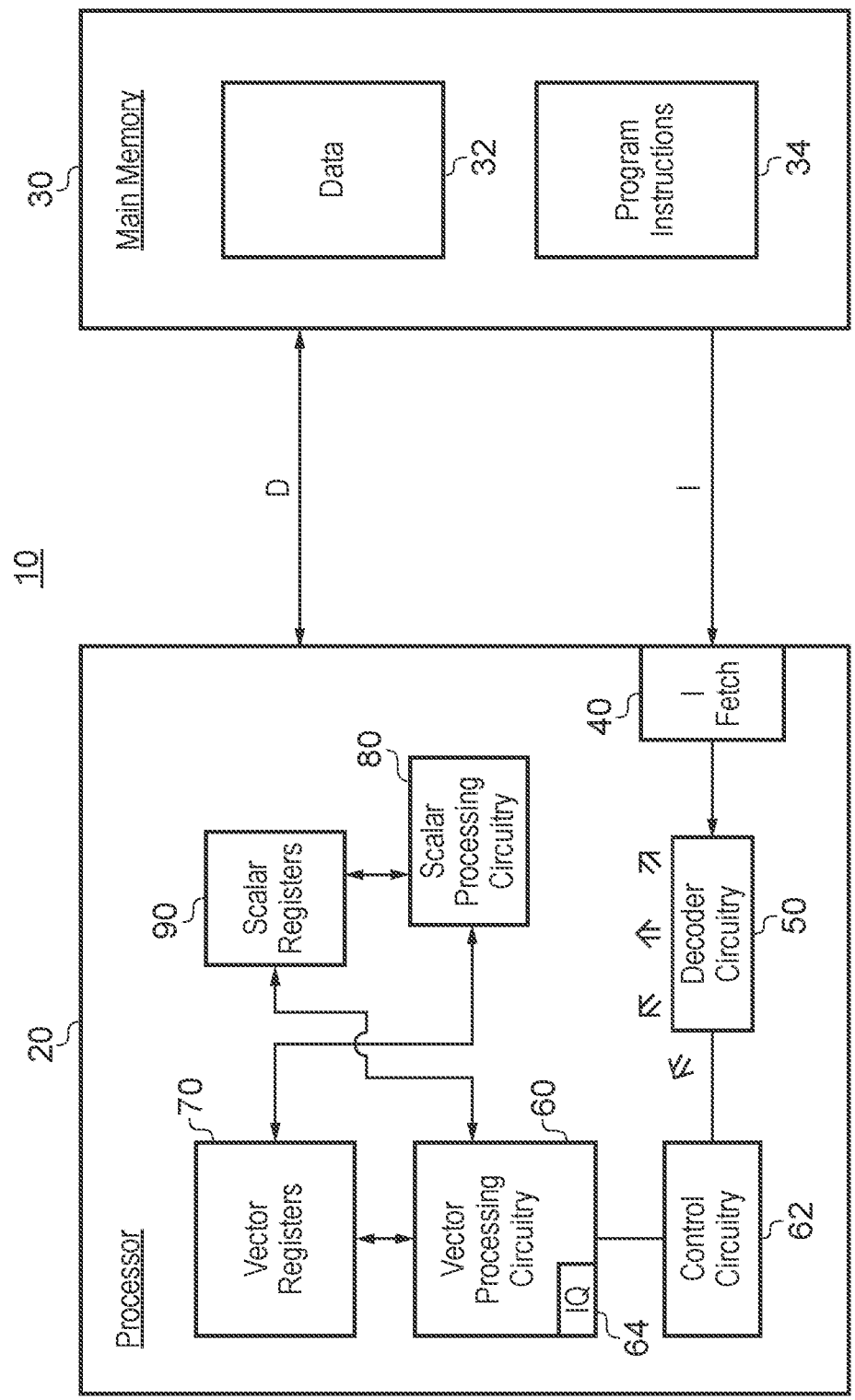

Before discussing the embodiments with reference to the accompanying figures, the following description of embodiments is provided.

An example embodiment provides data processing apparatus comprising:

vector processing circuitry to apply a vector processing instruction to data vectors having a data vector length, each data vector comprising a plurality of data items equal in number to the data vector length, the vector processing circuitry having circuitry defining a plurality of processing lanes, there being at least as many processing lanes as a maximum data vector length; and control circuitry to selectively vary the data vector length used by the vector processing circuitry amongst a plurality of possible data vector length values up to the maximum data vector length and to disable operation of a subset of the processing lanes so that the disabled subset of processing lanes are unavailable for use by the vector processing circuitry and there remain at least as many enabled processing lanes as the data vector length set by the control circuitry.

Example embodiments of the present disclosure recognise that in at least some circumstances, the performance of a vector processor does not necessarily increase linearly with vector length, whereas in at least some circumstances the power consumption of the vector processor does increase generally linearly with vector length. For example, the rate of change of performance (by an arbitrary or chosen measure, generally indicating a rate of achieving useful operations or calculations, or (in an inverse sense, where shorter is better) a run time of a program) with respect to vector length may lessen with increasing vector length, so that the fractional gain in performance by changing from a vector processing system having (say) a vector length of n to system having a vector length of 2 n may not in fact be a doubling of performance, but may be rather less than a doubling of performance. This in turn can mean that reducing the vector length of a vector processing system can provide a disproportionate benefit in terms of power consumption, which is to say that the benefit in terms of reduced power consumption can be proportionately much greater than the corresponding loss in performance.

But in a system where the vector length is a fixed physical feature of the design, it is not possible to implement such alterations in vector length.

These factors are recognised by the present disclosure, embodiments of which provide techniques to allow the vector length to be altered by control circuitry of the data processing apparatus itself.

Such an alteration can be made under program control, for example if the programmer realises or the compiler software detects that a particular vector length will be appropriate for a code section. In other examples, a trial portion of code can be executed at different vector lengths, in order to allow a detection of which vector length best provides a desired or required balance between performance and power consumption.

The alteration is different to an arrangement sometimes referred to as the use of predicate flags. Predicate flags provide conditional execution relating to respective processing lanes of a vector processor. In such situations the lanes remain available for use by the vector processor. In the present arrangements, by contrast, the subset of processing lanes is disabled, for example in such a way that in at least example embodiments, the vector processor operates as though it simply has a smaller number of processing lanes than the number corresponding to the maximum data vector length.

These arrangements can be appropriate to situations where the program code for execution is agnostic as regards vector length, which implies that the program code itself is independent of a particular vector length imposed by a data processing apparatus by which the program code is executed. This means that the vector length can be altered (for example, to provide a different or a desired balance between power consumption and execution speed) and the program code will still execute as intended.

In examples, in order to better achieve a useful power reduction, the control circuitry is configured to disable a power supply to the subset of processing lanes. However, in other examples the processing lanes could simply be disabled but could still retain some power supply.

In examples, the vector processing circuitry comprises an instruction decoder to decode vector processing instructions into sets of operations, the number of sets being equal to the data vector length set by the control circuitry. In this way, the decoding of vector instructions can be dynamically matched to the prevailing vector length. A further potential power reduction can be achieved in arrangements in which the vector processing circuitry comprises one or more data structures (an example being one or more instruction queues, one or more load/store queues, one or more issue queues or the like) to store information on the sets of operations; and the control circuitry is configured to selectively disable operation of a portion of the one or more data structures in dependence upon the data vector length set by the control circuitry. In this way, those parts of the one or more data structures which are not needed for the subset of (disabled) processing lanes can themselves be disabled.

In examples, the control circuitry is configured to temporarily inhibit (for example, stall) the decoding of vector processing instructions in response to an operation to change the data vector length. This can avoid instructions being decoded to operate with respect to a vector length which is no longer valid. In some examples, the control circuitry is configured to temporarily inhibit the decoding of vector processing instructions in response to an operation to increase the data vector length and to allow continued decoding of vector processing instructions in response to an operation to reduce the data vector length, because in at least some situations the latter operations can still execute correctly despite the change in vector length.

In examples of the vector processing circuitry, each processing lane comprises one or more data registers; the vector processing circuitry is configured to load data from a memory into the data registers and to write data from the registers to the memory; and to avoid incorrect data handling, the control circuitry is configured to inhibit the vector processing circuitry from writing data to the memory from data registers corresponding to the subset of (disabled) processing lanes. In some examples the control circuitry is configured to inhibit the vector processing circuitry from altering data values held by data registers corresponding to the subset of (disabled) processing lanes. In other examples, the control circuitry is configured to maintain or preserve data values held by data registers corresponding to the subset of processing lanes, for potential later use if and when the lanes are re-enabled. In other examples, such as security-based examples, the contents of any newly-disabled lanes can be zeroed (or deleted, or set to another value) as part of the operation to set a vector length.

Various types of control can initiate a change in vector length, such as an automatic detection based on a type of code being executed or the contents of a register. However, in examples the control circuitry is responsive to a set-length instruction to set a data vector length.

In some examples, the control circuitry is configured to temporarily enable all of the processing lanes during one or both of decoding and execution of a set-length instruction, and then to disable the subset of the processing lanes so that there remain as many enabled processing lanes as the data vector length. This technique of speculatively enabling lanes while the set-length instruction is itself being processed can give a more rapid access, by other executing instructions, to the full vector length allowable after completion of execution of the set-length instruction.

In embodiments, the apparatus is operable in a plurality of security modes such that instructions executed in a lower security mode cannot access data items accessible by instructions executed in a higher security mode; and the control circuitry is responsive to decoding of the set-length instruction in a current security mode to set the data vector length applicable to a lower security mode. This can in at least some circumstances potentially prevent the apparatus from incorrectly or inappropriately changing its own vector length. In examples, the control circuitry is responsive to decoding of the set-length instruction in the current security mode to set the data vector length applicable to the lower security mode to a data vector length no greater than the data vector length currently applicable to the current security mode.

As mentioned above, in examples, a trial execution of a code section or program can be used to detect an appropriate vector length for use. In such examples, the apparatus is configured to execute a set of instructions multiple times; and the control circuitry is configured to set a data vector length in response to one or more parameters of the processing of the set of instructions.

In examples, the set-length instruction is dependent upon an operand selected from the list consisting of: (i) an operand defining an absolute vector length value; and (ii) an operand defining a proportion of the maximum data vector length. Here, option (ii) allows the same form of set-length instruction to be used independently of the actual maximum data vector length of the data processing apparatus.

Another example embodiment provides data processing apparatus comprising:

vector processing means for applying a vector processing instruction to data vectors having a data vector length, each data vector comprising a plurality of data items equal in number to the data vector length, the vector processing means having means defining a plurality of processing lanes, there being at least as many processing lanes as a maximum data vector length; and control means for selectively varying the data vector length used by the vector processing circuitry amongst a plurality of possible data vector length values up to the maximum data vector length;

the control means being operable to disable operation of a subset of the processing lanes so that the disabled subset of processing lanes are unavailable for use by the vector processing means and there remain at least as many enabled processing lanes as the data vector length set by the control means.

Another example embodiment provides a data processing method comprising:

applying a vector processing instruction to data vectors having a data vector length, each data vector comprising a plurality of data items equal in number to the data vector length, using circuitry defining a plurality of processing lanes, there being at least as many processing lanes as a maximum data vector length; and selectively varying the data vector length used by the vector processing circuitry amongst a plurality of possible data vector length values up to the maximum data vector length, by disabling operation of a subset of the processing lanes so that the disabled subset of processing lanes are unavailable for use by the vector processing circuitry and there remain at least as many enabled processing lanes as the data vector length set by the control circuitry.

Referring now to the drawings, FIG. 1 schematically illustrates a data processing apparatus 10 comprising a processor 20 coupled to a memory 30 storing data values 32 and program instructions 34. The processor 20 includes an instruction fetch unit 40 for fetching program instructions 34 from the memory 30 and supplying the fetch program instructions to decoder circuitry 50. The decoder circuitry 50 decodes the fetched program instructions and generates control signals to control vector processing circuitry 60 to perform vector processing operations upon vector registers stored within vector register circuitry 70 as specified by the decoded vector instructions.

The vector processing circuitry 60 comprises one or more data structures (such as one or more instruction queues, load/store queues, issue queues or the like) 64 to store information on the sets of operations to be executed by the vector processing circuitry.

The processor 20 also comprises scalar processing circuitry 80 associated with scalar registers 90.

Control circuitry 62 is configured to selectively vary the data vector length used by the vector processing circuitry amongst a range or plurality of possible data vector lengths up to a maximum data vector length.

A general distinction between scalar processing and vector processing is as follows. Vector processing involves applying a single vector processing instruction to data items of a data vector having a plurality of data items at respective positions in the data vector. Scalar processing operates on, effectively, single data items rather than on data vectors.

Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

The discussion below relates to example program instructions 34. Embodiments of the present disclosure include an apparatus, for example of the type shown in FIG. 1, operable or configured to decode and execute such program instructions. FIG. 1 therefore provides an example of vector processing circuitry to apply a vector processing operation to data vectors having a data vector length, each data vector comprising a plurality of data items equal in number to the data vector length.

Figure 2:
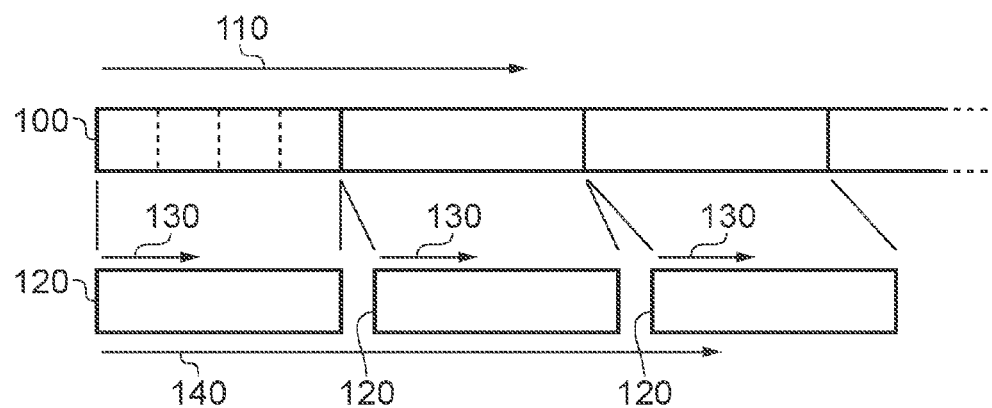

FIG. 2 schematically illustrates the handling of data as multiple data vectors. In this arrangement, a set of data items 100 are intended to be processed in a processing order 110. The data items 100 are in fact handled as successive data vectors 120 so that in a vector processing operation, a single vector processing instruction is applied to all of the data items in the data vector (for example, 4 data items, 8 data items or whatever the vector length of the particular system is) simultaneously. Each instance of the processing applied to a data item of the vector is referred to as a processing lane in the present description.

Having said this, each data vector 120 can retain a data item processing order 130, and from vector to vector there is a vector processing order 140, so that if any reference is needed during processing to the original processing order 110, this can be achieved by considering the data vectors in the vector processing order 140 and considering data items within each data vector in the data item processing order 130.

The vector processing circuitry of FIG. 1 has circuitry defining a plurality of processing lanes, there being at least as many processing lanes as a maximum data vector length.

In FIG. 1, the control circuitry 62 handles operations to disable a subset of processing lanes so as to change the vector length available for use by the apparatus. In particular the control circuitry is configured to disable operation of a subset of the processing lanes so that the dialled subset of processing lanes are unavailable for use by the vector processing circuitry and there remain at least as many enabled processing lanes as the vector length set by the control circuitry 62. The disabled subset could be distributed within the set of Max VL processing lanes, but in example embodiments the disabled subset is contiguous and at the higher-ordered end of the set of Max VL processing lanes. For example, an instruction to set VL=½ Max VL (in other words to disable half of the lanes) would disable those lanes from Max VL/2 to Max VL−1. This means that at any time, the system is operating with a set of VL processing lanes numbered or ordered contiguously from 0 to VL−1.

Figure 3:
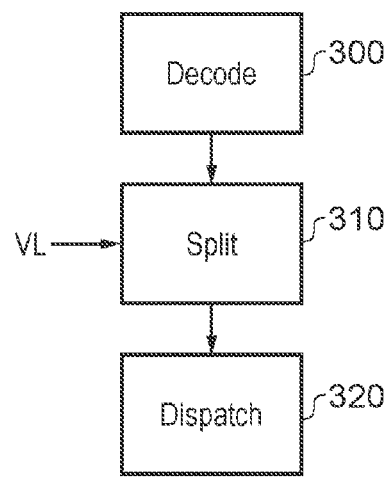

FIG. 3 schematically illustrates the operation of decoder circuitry such as the decoder circuitry 50 of FIG. 1. The flow chart of FIG. 3 is simplified for the purposes of illustrating technical points relevant to the present discussion. It will be appreciated that further operations may be performed as part of the operation of the decoding circuitry 50.

The decoder circuitry 50 is (optionally) operable to decode vector processing instructions into sets of operations, the number of sets being equal to the data vector length, which in the present embodiments is set by the control circuitry 62. This can occur, for example, for multiple stage instructions such as scatter, gather and the like. Other operations are carried out as single vector processing instructions.

A step 300 involves decoding a vector processing instruction. At a step 310 the decoded instruction is split or "cracked" into sets of operations applied to data items 100 of successive data vectors 120 as discussed with reference to FIG. 2. The operation at the step 310 is responsive to the current vector length (VL) established by the control circuitry 62. At a step 320 the sets of operations are dispatched for execution by the vector processor. The operations of the steps 300, 310 by the decoder circuitry 50 provide an example of an instruction decoder to decode vector processing instructions into sets of operations, the number of sets being equal to the data vector length set by the control circuitry.

Figure 4:
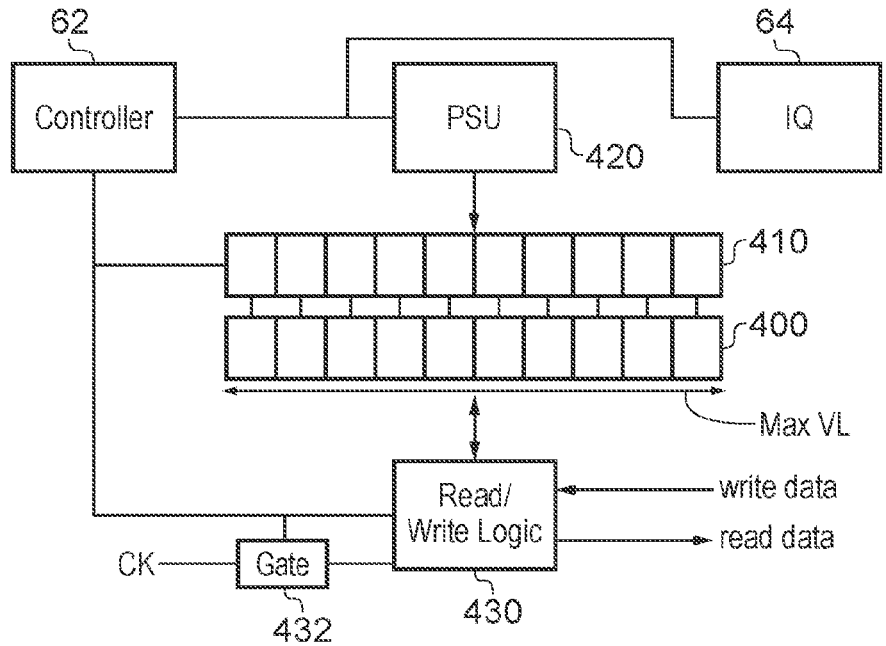

FIG. 4 schematically illustrates control circuitry and part of the vector processor.

Vector processing is applied by carrying out the same processing operation, generally in parallel, in respect of a set or vector of data items. This arrangement can rely upon various calculation components and register storage for each of the processing lanes (one processing lane corresponding to the processing applied to one data item in a data vector). In FIG. 4, a set of registers 400 and a set of calculation and control elements 410 provide a simplified representation of the processing arrangements used by the vector processor. There are one register 400 and one processing element 410 for each processing lane (though it will be appreciated that many more components may be involved in a real implementation of a processing lane). The total number of processing lanes shown in FIG. 4 corresponds to the maximum possible data vector length ("Max VL") of the system. This is a physical upper limit on the data vector width and represents the number of processing lanes available to the vector processor if all of them are enabled by the control circuitry 62 (that is to say, if a current subset of disabled lanes is zero). However, in the present embodiments, under the control of the control circuitry 62 a smaller data vector width can be selectively used instead of the maximum data vector width Max VL.

It will be appreciated that in a typical system, Max VL could be much larger than that shown schematically in FIG. 4. For example, Max VL could be 256 bit, 512 bit, 1024 bit or another value. Here, for example, "256 bit" represents up to 32 8-bit elements, or up to 16 16-bit elements, or up to 4 64-bit elements. The example value of Max VL in FIG. 4 is simply for the purposes of explanation.

The control circuitry 62 is configured to disable operation of a subset of the processing lanes so that the disabled subset of processing lanes are unavailable for use by the vector processing circuitry. This can be achieved in various ways.

In an example, the control circuitry 62 controls the operation of a power supply unit (PSU) 420 which supplies power to at least parts of (or all of) each of the respective processing lanes, so as to selectively remove power from the subset of (disabled) processing lanes, for example by disabling a power supply to the subset of processing lanes.

In another example, the control circuitry 62 supplies a control signal to the subset of processing lanes so as to disable operation of the respective processing element 410. The processing elements can include, for example, arithmetic logic units, multipliers and the like, which can be selectively disabled by disconnection form the remaining circuitry, power supply gating or clock gating (see below).

In another example, read/write logic 430, which controls the reading from and writing to the register elements 400, act under the control of the control circuitry 62 so as to inhibit reading from or writing to register elements 400 corresponding to the subset of (disabled) processing lanes. In this example, each processing lane comprises one or more data registers such as the register elements 400, the vector processing circuitry is configured to load data from a memory (not shown in FIG. 4, but shown as the memory 30 in FIG. 1) into the data registers and to write data from the registers to the memory; and the control circuitry 62 is configured to inhibit the vector processing circuitry from writing data to the memory from data registers corresponding to the subset of processing lanes.

In examples, the registers corresponding to currently disabled processing lanes can be entirely disabled or powered down, or their contents can be retained (either by providing power to them, or by using a non-volatile memory element for the registers 400), though in such a way that access to those registers corresponding to currently disabled processing lanes is prevented or inhibited. This is an example of the control circuitry 62 being configured to inhibit the vector processing circuitry from altering data values held by data registers corresponding to the subset of processing lanes, for example involving maintaining data values held by data registers corresponding to the subset of processing lanes.

In other examples, instead of (or in addition to) varying the power supply to various components as discussed above, the control circuitry 62 can apply a so-called clock-gating process. An example is shown schematically in FIG. 4 in respect of the read/write logic 430, but the same arrangement can be applied to other aspects of the processing lanes such as the registers 400 and/or the processing elements 410. A clock signal CK is processed by a clock gate 432 before being supplied to the read/write logic (or to parts of the read/write logic applicable to disabled processing lanes). Under the control of a signal from the control circuitry 62, the clock gate 432 passes or blocks the clock signal CK. So, as at least a part of disabling one or more processing lanes, the clock signal CK can be blocked from one or more components relating to those processing lanes.

Disabling the subset of processing lanes can also (or instead) involve disabling (for example, by clock gating or power gating) communication circuitry such as bus drivers relating to the disabled lanes.

In further examples, the sets of processing elements and registers may include so-called permute logic arranged to conduct cross-lane operations (where the contents of a register can depend upon operations carried out with respect to the contents of one or more other registers). In examples, the permute logic operates under the control of the control circuitry 62 so as to be inhibited from carrying out operations which do either or both of (a) deriving the contents of a currently active lane from those of one or more currently disabled lanes, and (b) deriving the contents of a currently disabled lane.

It will be appreciated that combinations of these approaches, and other similar approaches, may be used in order to carry out the functionality of disabling operation of the subset of the processing lanes. It will also be appreciated that the alteration is different to an arrangement sometimes referred to as the use of predicate flags. Predicate flags provide conditional execution relating to respective processing lanes of a vector processor. In such situations the lanes remain available for use by the vector processor. In the present arrangements, by contrast, the subset of processing lanes is disabled so as to be unavailable for use by the vector processor, the vector processor operates as though it simply has a smaller number of processing lanes than the number corresponding to the maximum data vector length. Disabled lanes in the context of the present application are not written back to memory.

Predicated lanes may be preserved as part of register write-backs. In particular, a merging vector load may only load a subset of element while preserving the remaining values originally held by the designation register. In an OoO (out of order) processor, renaming may require the move of those remaining values from the destination register prior to renaming to the newly renamed register. Examples of the present system may not make any guarantees about the content of disabled lanes.

In another example, in order to save power by not providing power to or enabling operation of un-needed structures in the case where the prevailing vector length VL is less than Max VL, the control circuitry 62 is configured to selectively disable operation of a portion of the data structure(s) 64 in dependence upon the data vector length set by the control circuitry, for example by controlling power supply to those data structures and/or by clock-gating those data structures as discussed above.

Figure 5:
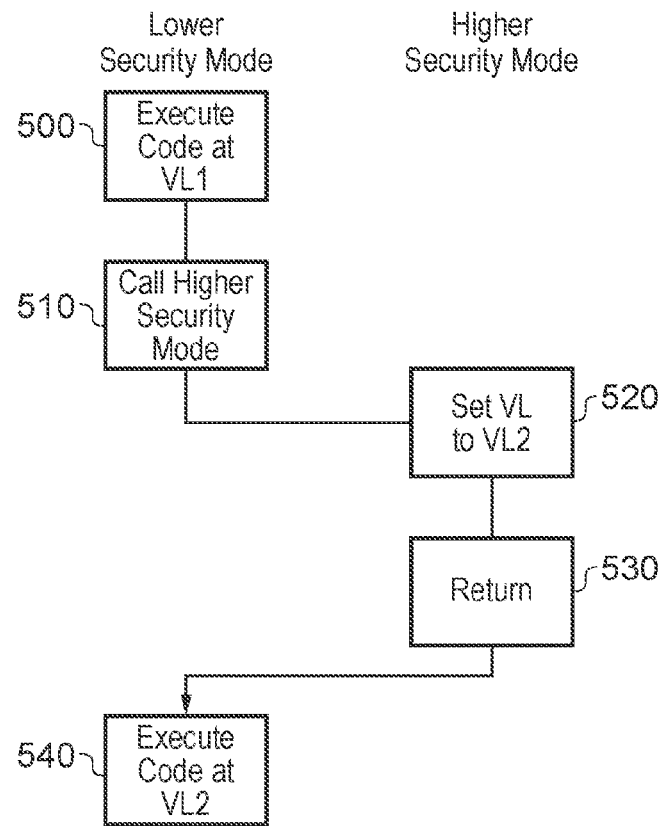
FIG. 5 is a schematic flowchart showing the setting of a vector length.

FIG. 5 is a schematic flow chart showing the setting of a vector length by the control circuitry 62. In this example, the vector length for use by a lower security mode can only be set by program code operating in a higher security mode.

The processor 20 is configured to perform processing activities in two or more security modes. The security modes can be arranged so as to inhibit a processing activity performed in one of the security modes from accessing at least some information associated with a processing activity performed in another of the security modes. For example, two or more security modes including a higher security level mode and a lower security level mode may be provided, such that operations of the processing element in a lower security level mode cannot access (or at least is inhibited from accessing) at least some information (such as register contents, or parts of the address space) associated with operations of the processing element in a higher security level mode. In other examples, two or more mutually exclusive security modes could be provided, so that when the processor 20 is operating in one of the two or more complementary security modes, it cannot access at least some information associated with operations in another of the two or more complementary security modes. These arrangements may be combined.

One use of different security modes of a processing element is in the context of virtualisation, in which multiple operating systems co-exist on a single processing element as so-called virtual machines, each under the control or oversight of a so-called hypervisor. Various steps can be taken to avoid inappropriate interference between the different virtual machines. For example, applications can run at a lowest security level; operating systems can run at a next higher security level, and the hypervisor can run at a still higher security level. In this way, protection can be built into the system to avoid (for example) an application running under one of the operating systems corrupting information used by an application running under another of the operating systems.

A temporary change in security mode can be implemented as a branch from program instructions running in one security mode to a function or subroutine under a different security mode. In order to allow registers associated with the processing element to be used in the second (new) security mode without necessarily disclosing or allowing corruption of the content of those registers as used by the first (original) security mode, it can be appropriate for the processor 20 to store those registers in memory storage such as a processor stack. This also allows the processing activity in the first security mode to resume with the same register parameters that applied when the branch to the function or subroutine took place.

Referring to FIG. 5, at a step 500, program code is executed under the lower security mode according to a data vector length VL1. At a step 510, the program code in the lower security mode makes a call to the higher security mode. Control is transferred to the higher security mode and, at a step 520, program code running under the higher security mode sets the vector length applicable to the lower security mode to a new vector length VL2, and at a step 530 executes a return back to the lower security mode. At a step 540, the lower security mode executes program code at the vector length VL2.

A further constraint (in addition to the constraint that the vector length for a particular security mode can be set only by code running at a higher security mode) is that the vector length for a lower security mode can be no greater than the vector length set for a next-higher security mode. This provides an example of the control circuitry 62 being responsive to decoding of the set-length instruction in a current security mode to set the data vector length applicable to a lower security mode to a data vector length no greater than the data vector length currently applicable to the current security mode.

This therefore provides an example of the apparatus being operable in a plurality of security modes such that instructions executed in a lower security mode cannot access data items accessible by instructions executed in a higher security mode, the control circuitry 62 being responsive to decoding of a set length instruction in a current security mode to set the data vector length applicable to a lower security mode.

The process of setting a vector length VL by the control circuitry 62 may allow for any VL value between 1 (or 2, in order for the term "vector" to apply in a useful way) up to VL Max. However, in some examples, the selectable values of VL are limited to a subset of all such available values. For example, both VL Max and a selectable value of VL may be restricted to be multiples of a particular value such as multiples of 128. As an example, if Max VL is 1024, VL can be set by the control circuitry 62 to be any one of 128, 256, 384, 512, 640, 768, 896 or 1024 bits (see the discussion above). In examples, at least some components used by the vector processor (such as registers 400, processing elements 410 and the like) can be arranged in banks of (say) 128-bit wide units, so that clock gating, power gating or other techniques can be applied on a bank-by-bank basis rather than requiring individual attention to each such element.

While there is not necessarily a structural limitation on how often VL can be changed, it can be appropriate for the system (under program control, for example) not to make changes more often than, say every 100 or 1000 instructions. This can help to avoid or reduce inefficiencies resulting from operations and administration (for example, changing security level, or stalling decoding as discussed below) occurring at a change of VL.

Figure 6:
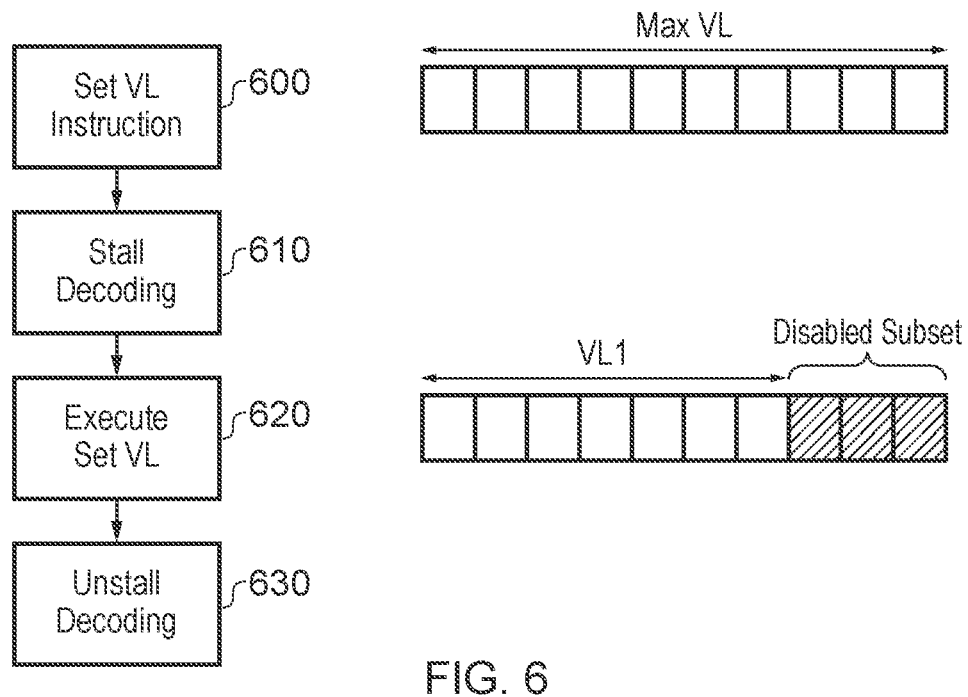
FIGS. 6 and 7 are schematic flowcharts illustrating a process to set a vector length.
Figure 7:
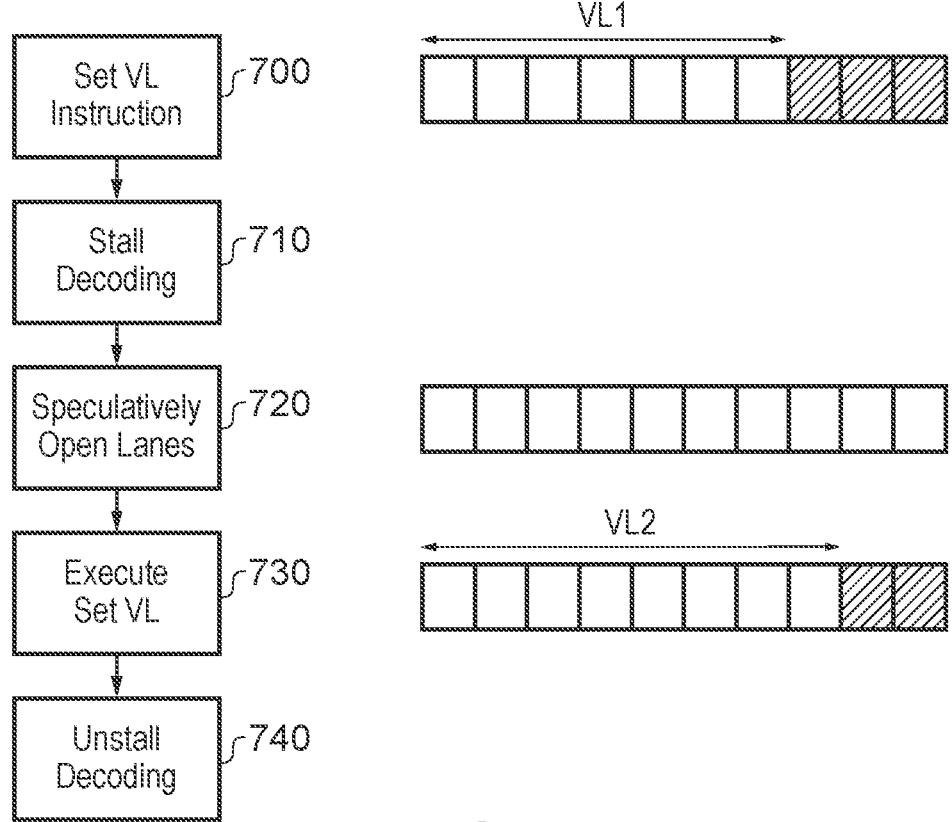

FIGS. 6 and 7 are schematic flow charts illustrating a process to set a vector length.

Referring to FIG. 6, flow chart steps are shown on the left side of the drawing and the effect on a schematic representation of the vector length is shown on the right side of the drawing.

The process starts with the current vector length being equal to Max VL, and at a step 600, a data processing instruction "Set VL" is decoded. At a step 610, the decoder 50, acting by its own detection (for example, a detection of the initiation of decoding of a Set VL instruction) or acting under the control of a control signal from the control circuitry 62, "stalls" or temporarily inhibits the decoding of other instructions. This is carried out to allow the vector length to be set to the new vector length value before decoding continues, so that instructions are not decoded for execution with respect to a newly incorrect vector length value. Therefore, in this example, the control circuitry 62 is configured to temporarily inhibit the decoding of vector processing instructions in response to an operation to change the data vector length. Note that although the stall could apply to all instructions, in other examples the stall applies to instructions for which the vector length is relevant. For example, an early stage decode operation may identify such operations. Other operations which do not depend on vector length, for example, in the context of a superscalar CPU (central processing unit) which has multiple decoders, can continue to be decoded.

The stall operation (here and in connection with a step 710 of FIG. 7 discussed below) is useful in instances where the operation to disable or to wake up (re-enable) lanes takes a non-trivial length of time, for example more than a few (for example, three) cycles. If the disable or wake up operation takes less than this length of time, the stall may not be appropriate.

In some examples the stalling step 610 is carried out only in respect of operations to increase the vector length and not in respect of operations which will leave the vector length unchanged or reduced. In this example, the control circuitry 62 is configured to temporarily inhibit the decoding of vector processing instructions in response to an operation to increase the data vector length and to allow continued decoding of vector processing instructions in response to an operation to reduce the data vector length.

At a step 620 the Set VL instruction is executed, in this example setting the vector length to a vector length of VL1. In some examples (such as in security enabled software) the execution of the Set VL instruction can cause a particular value such as zero to be written to any newly disabled lanes, for example just before they are disabled. This can inhibit other software or libraries from inappropriately accessing data previously held by those lanes. The zeroing (or writing of another value) can be done by hardware or software.

Then, at a step 630 decoding is resumed or "unstalled". The execution of the step 620 is an example of the control circuitry being responsive to a set-length instruction to set a data vector length.

Note that the Set VL instruction can implement a change to an absolute value of vector length, for example "Set VL to 64". However, in the interests of providing that the Set VL instruction is itself vector length agnostic (which is to say, it will work correctly on different data processing apparatus having different physical limits or Max VL) another option is that the Set VL instruction is defined and executed so as to set the vector length to a particular proportion of Max VL, whatever Max VL is on that particular data processing apparatus. For example, the instruction could be of the form "Set VL to Max VL/4". The vector length VL1 in the present discussion should therefore be interpreted either as an absolute vector length or as a relative vector length expressed with reference to the Max VL of the particular executing apparatus. Note that the use of Max VL values which are powers of two, and Set VL instructions which vary VL by powers of two relative to Max VL, are useful in this context. Therefore, different versions or "flavours" of Set VL can be considered. Set VL can act according to an immediate or register-dependent operand defining a multiple of a fixed size (such as 128-bit). This can be capped at Max VL. Alternatively, Set VL can act according to an immediate or register-dependent operand describing a fraction of whatever the prevailing VL Max value is (such as 1, ½, ¼, ⅛, . . . ). These options provide examples of the set-length instruction being dependent upon an operand selected from the list consisting of: (i) an operand defining an absolute vector length value; and (ii) an operand defining a proportion of the maximum data vector length. A variant of this process is shown in FIG. 7 which takes as its starting point a current vector length of VL1.

At a step 700, a set VL instruction is decoded and at a step 710, decoding of other instructions is stalled. Note that as discussed above, the stall operation is appropriate for the decoding of instructions which depend on VL but may be optional for the decoding of other instructions.

At a step 720, all of the processing lanes (up to the Max VL vector length) are enabled temporarily on a speculative basis. At a step 730 the Set VL instruction is executed, in this example to establish VL to a new value of VL2, and at a step 740 decoding of other instructions is unstalled. The step 720 is an example of the control circuitry 62 being configured to temporarily enable all of the processing lanes during one or both of decoding and execution of a set-length instruction, and then to disable the subset of the processing lanes so that there remain as many enabled processing lanes as the data vector length.

Note that if (as in this schematic example) VL2 is greater than VL1, there will be some lanes which are newly enabled (are no longer part of the disabled subset) as a result of the Set VL instruction. In some examples, the values initially held by the newly opened lanes may be the last values written there, but in other examples the contents of the newly opened lanes are treated as unknown.

Figure 8:
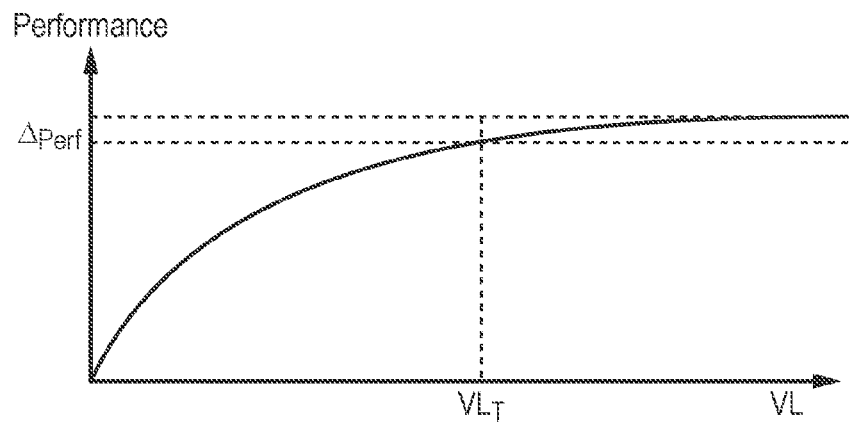
FIGS. 8 and 9 are schematic graphs.
Figure 9:
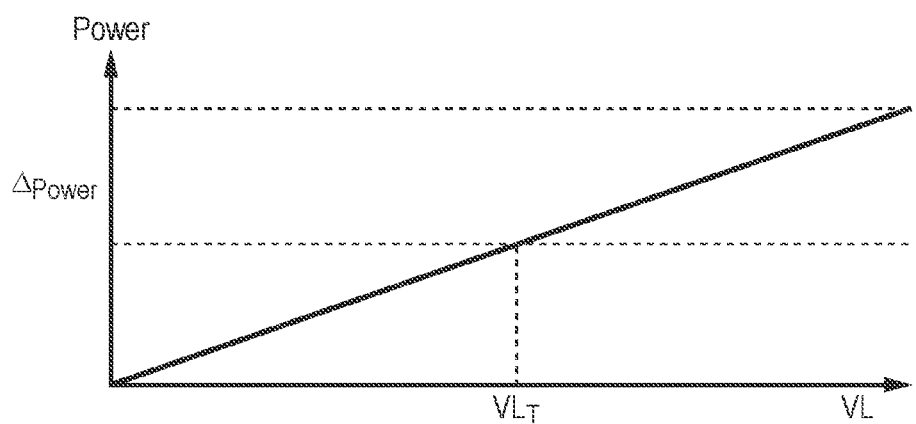

FIGS. 8 and 9 are schematic graphs. FIG. 8 schematically illustrates example empirical results relating "performance" (for example, processing throughput) to vector length VL and FIG. 9 relates power consumption to the vector length VL. The results of FIG. 9 can be obtained by empirical trials or by prediction against a model of the processing circuitry.

An example vector length value, $VL_T$ is illustrated. Because of the asymptotic behaviour of the performance curve, increasing the vector length beyond $VL_T$ (for example, doubling it) may lead to a small increase in performance but a potential large increase in power consumption, for example a doubling of power consumption. (Note however that due to the reduced run time of the program and the influence of other processor components, when the change is applied to a specific task to be performed, this does not imply an increase in energy consumption of 100%).

More generally, for a required level of performance, a vector length VL can be derived which can provide that required level of performance at a minimum power consumption. Techniques for arriving at such a value of VL will now be discussed with reference to FIGS. 10 to 12.

Figure 10:
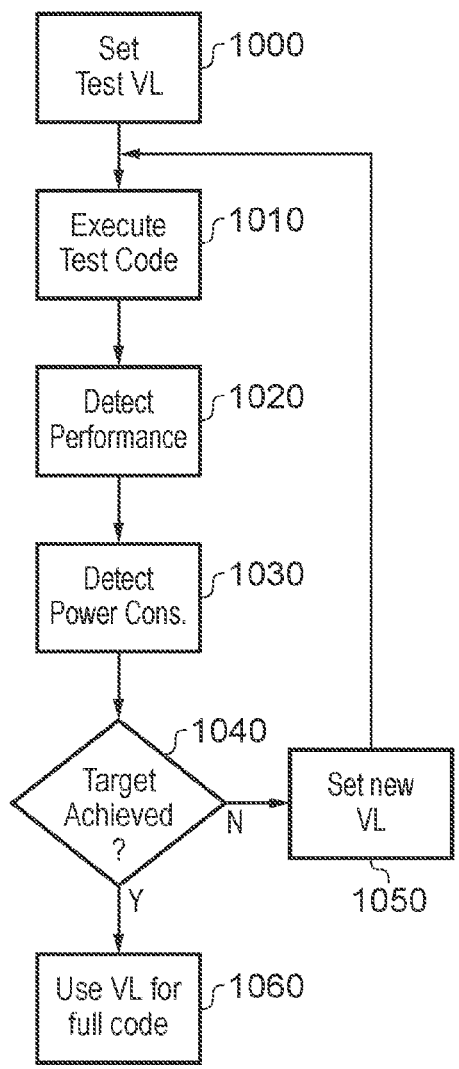
FIGS. 10 and 11 are schematic flowcharts illustrating variants of a process to detect a suitable vector length.
Figure 11:
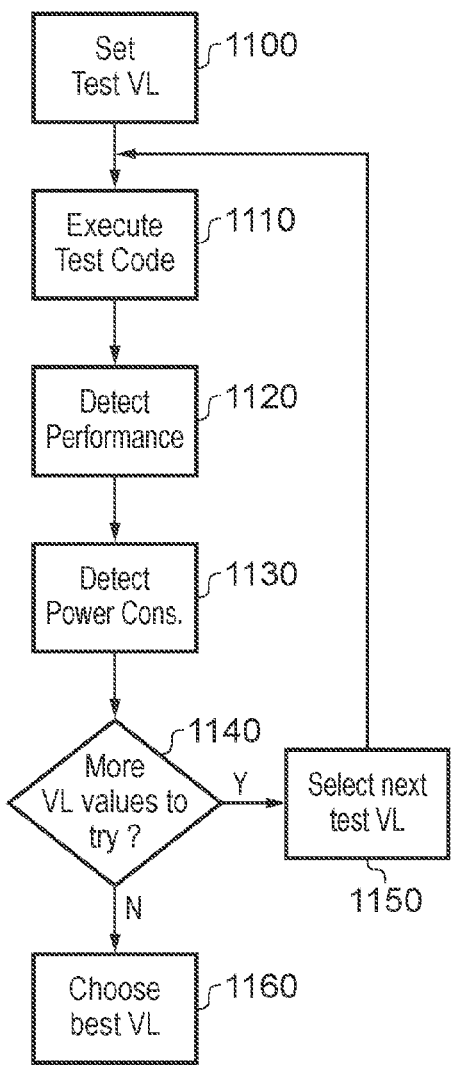

FIGS. 10 and 11 are schematic flow charts illustrating example processes or program flows for empirically determining a required VL by running tests or example code on a vector processing apparatus.

Referring to FIG. 10, at a step 1000, an initial test VL value is established and at a step 1010, a portion of test program code is executed (such as the first few iterations of a long-running loop). The test program code can be program code created to allow this type of detection or can be a test portion of a real program intended for execution, or can be an initial portion of program code being executed by the processor 20.

At a step 1020, the performance or data processing throughput of the processor under the current value of VL is detected, and at an optional step 1030 the power consumption of the vector processing arrangement is also detected or otherwise obtained (for example by a look-up table of vector length against power consumption).

At a step 1040, a detection is made as to whether a target performance, (optionally) power consumption or both have been achieved. If the answer is yes then at a step 1060 the current test value of vector length VL is used for execution of the full program code. If not then at a step 1050 a new, different value of VL is established and the steps 1010 . . . 1040 are repeated. In examples, a maximum number of repetitions may be imposed so that the testing process of FIG. 10 does not go on indefinitely.

Note that for the purposes of assessing performance (though not for assessing power consumption) a predicate mask can be used to emulate operation at a lower VL than VL Max at the step 1010. However, as discussed above, for actual operation the relevant subset of processing lanes is disabled in a manner which is different to the use of predicate masks.

FIG. 11 is similar in many respects, and the steps 1100, 1110, 1120 and (optionally) 1130 correspond to respective steps 1000, 1010, 1020 and 1030 in FIG. 10. A test is applied at a step 1140 which detects whether, amongst a set of candidate VL values, there remain more candidate VL values still to be tried. If the answer is yes then at a step 1150 a next test VL value is selected and control passes back to the step 1110. If the answer is no then at a step 1160 the best value of VL amongst those tested (giving the closest approximation to a required performance and/or power consumption, or giving the best performance while not exceeding a required power consumption) is selected.

FIGS. 10 and 11 therefore provide examples of the apparatus being configured to execute a set of instructions multiple times; and the control circuitry 62 being configured to set a data vector length in response to one or more parameters of the processing of the set of instructions.

Figure 12:
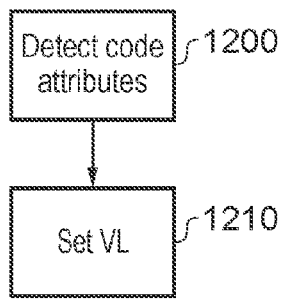
FIG. 12 is a schematic flowchart illustrating a vector length selection process.

A different approach is illustrated schematically in FIG. 12, in which at step 1200 attributes of the program code to be executed are detected, and at a step 1210 a VL value is established based upon the detection.

Figure 13:
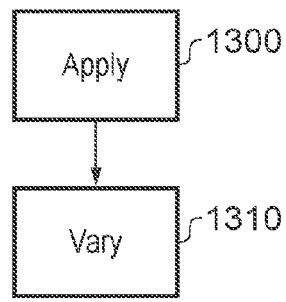
FIG. 13 is a schematic flowchart illustrating a method of data processing.

FIG. 13 is a schematic flowchart illustrating a data processing method comprising:

applying, at a step 1300, a vector processing instruction to data vectors having a data vector length, each data vector comprising a plurality of data items equal in number to the data vector length, using circuitry defining a plurality of processing lanes, there being at least as many processing lanes as a maximum data vector length; and selectively varying, at a step 1310, the data vector length used by the vector processing circuitry amongst a plurality of possible data vector length values up to the maximum data vector length, by disabling operation of a subset of the processing lanes so that the disabled subset of processing lanes are unavailable for use by the vector processing circuitry and there remain at least as many enabled processing lanes as the data vector length set by the control circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function, in which case software or program instructions by which the function is performed, and a providing medium such as a non-transitory machine-readable medium by which such software or program instructions are provided (for example, stored) are considered to represent embodiments of the disclosure. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

We claim:

1. Data processing apparatus comprising:

vector processing circuitry to apply a vector processing instruction to data vectors having a data vector length, each data vector comprising a plurality of data items equal in number to the data vector length, the vector processing circuitry having circuitry defining a plurality of processing lanes, there being at least as many processing lanes as a maximum data vector length; and control circuitry to selectively vary the data vector length used by the vector processing circuitry amongst a plurality of possible data vector length values up to the maximum data vector length and to disable operation of a subset of the processing lanes so that the disabled subset of processing lanes are unavailable for use by the vector processing circuitry and there remain at least as many enabled processing lanes as the data vector length set by the control circuitry;

wherein the vector processing circuitry comprises an instruction decoder to decode vector processing instructions into sets of operations, the number of sets being equal to the data vector length set by the control circuitry, and wherein the control circuitry is configured to temporarily inhibit the decoding of vector processing instructions in response to an operation to increase the data vector length and to allow continued decoding of vector processing instructions in response to an operation to reduce the data vector length.

2. Apparatus according to claim 1, in which the control circuitry is configured to disable a power supply to the subset of processing lanes.

3. Apparatus according to claim 1, in which:
the vector processing circuitry comprises one or more data structures to store information on the sets of operations; and
the control circuitry is configured to selectively disable operation of a portion of the one or more data structures in dependence upon the data vector length set by the control circuitry.

4. Apparatus according to claim 1, in which:
each processing lane comprises one or more data registers;
the vector processing circuitry is configured to load data from a memory into the data registers and to write data from the registers to the memory; and
the control circuitry is configured to inhibit the vector processing circuitry from writing data to the memory from data registers corresponding to the subset of processing lanes.

5. Apparatus according to claim 4, in which the control circuitry is configured to inhibit the vector processing circuitry from altering data values held by data registers corresponding to the subset of processing lanes.

6. Apparatus according to claim 5, in which the control circuitry is configured to maintain data values held by data registers corresponding to the subset of processing lanes.

7. Apparatus according to claim 1, in which the control circuitry is responsive to a set-length instruction to set a data vector length.

8. Apparatus according to claim 7, in which the control circuitry is configured to temporarily enable all of the processing lanes during one or both of decoding and execution of a set-length instruction, and then to disable the subset of the processing lanes so that there remain as many enabled processing lanes as the data vector length.

9. Apparatus according to claim 7, in which:
the apparatus is operable in a plurality of security modes such that instructions executed in a lower security mode cannot access data items accessible by instructions executed in a higher security mode; and
the control circuitry is responsive to decoding of the set-length instruction in a current security mode to set the data vector length applicable to a lower security mode.

10. Apparatus according to claim 9, in which the control circuitry is responsive to decoding of the set-length instruction in the current security mode to set the data vector length applicable to the lower security mode to a data vector length no greater than the data vector length currently applicable to the current security mode.

11. Apparatus according to claim 7, in which the set-length instruction is dependent upon an operand selected from the list consisting of:
(i) an operand defining an absolute vector length value; and
(ii) an operand defining a proportion of the maximum data vector length.

12. Apparatus according to claim 1, in which:
the apparatus is configured to execute a set of instructions multiple times; and
the control circuitry is configured to set a data vector length in response to one or more parameters of the processing of the set of instructions.

13. Data processing apparatus comprising:
vector processing means for applying a vector processing instruction to data vectors having a data vector length, each data vector comprising a plurality of data items equal in number to the data vector length, the vector processing means having means defining a plurality of processing lanes, there being at least as many processing lanes as a maximum data vector length; and
control means for selectively varying the data vector length used by the vector processing circuitry amongst a plurality of possible data vector length values up to the maximum data vector length;
the control means being operable to disable operation of a subset of the processing lanes so that the disabled subset of processing lanes are unavailable for use by the vector processing means and there remain at least as many enabled processing lanes as the data vector length set by the control means;
wherein the vector processing means comprises an instruction decoding means for decoding vector processing instructions into sets of operations, the number of sets being equal to the data vector length set by the control circuitry, and
wherein the control means is operable to temporarily inhibit the decoding of vector processing instructions in response to an operation to increase the data vector length and to allow continued decoding of vector processing instructions in response to an operation to reduce the data vector length.

14. A data processing method comprising:
applying a vector processing instruction to data vectors having a data vector length, each data vector comprising a plurality of data items equal in number to the data vector length, using circuitry defining a plurality of processing lanes, there being at least as many processing lanes as a maximum data vector length;
selectively varying the data vector length used by the vector processing circuitry amongst a plurality of possible data vector length values up to the maximum data vector length, by disabling operation of a subset of the processing lanes so that the disabled subset of processing lanes are unavailable for use by the vector processing circuitry and there remain at least as many enabled processing lanes as the data vector length set by the control circuitry;
wherein the applying a vector processing instruction to data vectors comprises decoding vector processing instructions into sets of operations, the number of sets being equal to the data vector length set by the control circuitry, and
the method further comprising temporarily inhibiting the decoding of vector processing instructions in response to an operation to increase the data vector length and allowing continued decoding of vector processing instructions in response to an operation to reduce the data vector length.

* * * * *